(12) United States Patent
Suzui et al.

(10) Patent No.: US 6,678,174 B2
(45) Date of Patent: Jan. 13, 2004

(54) POWER CONVERTING APPARATUS, CONTROL METHOD THEREFOR, AND POWER GENERATION SYSTEM

(75) Inventors: Masaki Suzui, Kyoto (JP); Naoki Manabe, Kanagawa (JP); Nobuyoshi Takehara, Kyoto (JP); Seiji Kurokami, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/993,655

(22) Filed: Nov. 27, 2001

(65) Prior Publication Data

US 2002/0085397 A1 Jul. 4, 2002

(30) Foreign Application Priority Data

Nov. 27, 2000 (JP) ........................ 2000-360201

(51) Int. Cl.[7] .............................. H02H 7/122; H02J 3/00
(52) U.S. Cl. ............................................. 363/55; 363/34
(58) Field of Search .................... 363/34, 35, 37, 363/55, 56.1, 56.05, 56.12

(56) References Cited

U.S. PATENT DOCUMENTS

| | | | |
|---|---|---|---|
| 4,494,180 A | * 1/1985 | Streater et al. | 363/37 |
| 6,169,678 B1 | 1/2001 | Kondo et al. | 363/71 |
| 6,320,769 B2 | * 11/2001 | Kurokami et al. | 363/56.03 |

FOREIGN PATENT DOCUMENTS

| | | |
|---|---|---|
| JP | 07-222436 | 8/1995 |
| JP | 2960469 | 7/1999 |
| JP | 11-215808 | 8/1999 |

OTHER PUBLICATIONS

U.S. patent application No. 09/286,846, filed on Apr. 4, 1999.
U.S. patent application No. 09/791,588, filed on Feb. 26, 2001.
U.S. patent application No. 09/960,282, fied on Sep. 24, 2001.
U.S. patent application No. 09/960,284, filed on Sep. 24, 2001.

* cited by examiner

Primary Examiner—Matthew V. Nguyen
(74) Attorney, Agent, or Firm—Fitzpatrick, Cella, Harper & Scinto

(57) ABSTRACT

In a solar power generation system having an inverter, if a smoothing capacitor in the inverter degrades, the operation of the inverter is interrupted, and a loss in the amount of power generation occurs inevitably. To prevent this loss, a degradation determination section (211) and output suppressing section (212) are provided in an inverter (2). If the degradation determination section (211) determines a degradation in capacitor (24), the operation of the inverter (2) is continued while suppressing the output current of the inverter (2) by the output suppressing section (212). In addition, a warning section (213) warns the user about the degradation in capacitor (24). With this arrangement, a solar power generation system capable of detecting a degradation in smoothing capacitor in the inverter (2) and appropriately operating the inverter (2) can be provided.

19 Claims, 12 Drawing Sheets

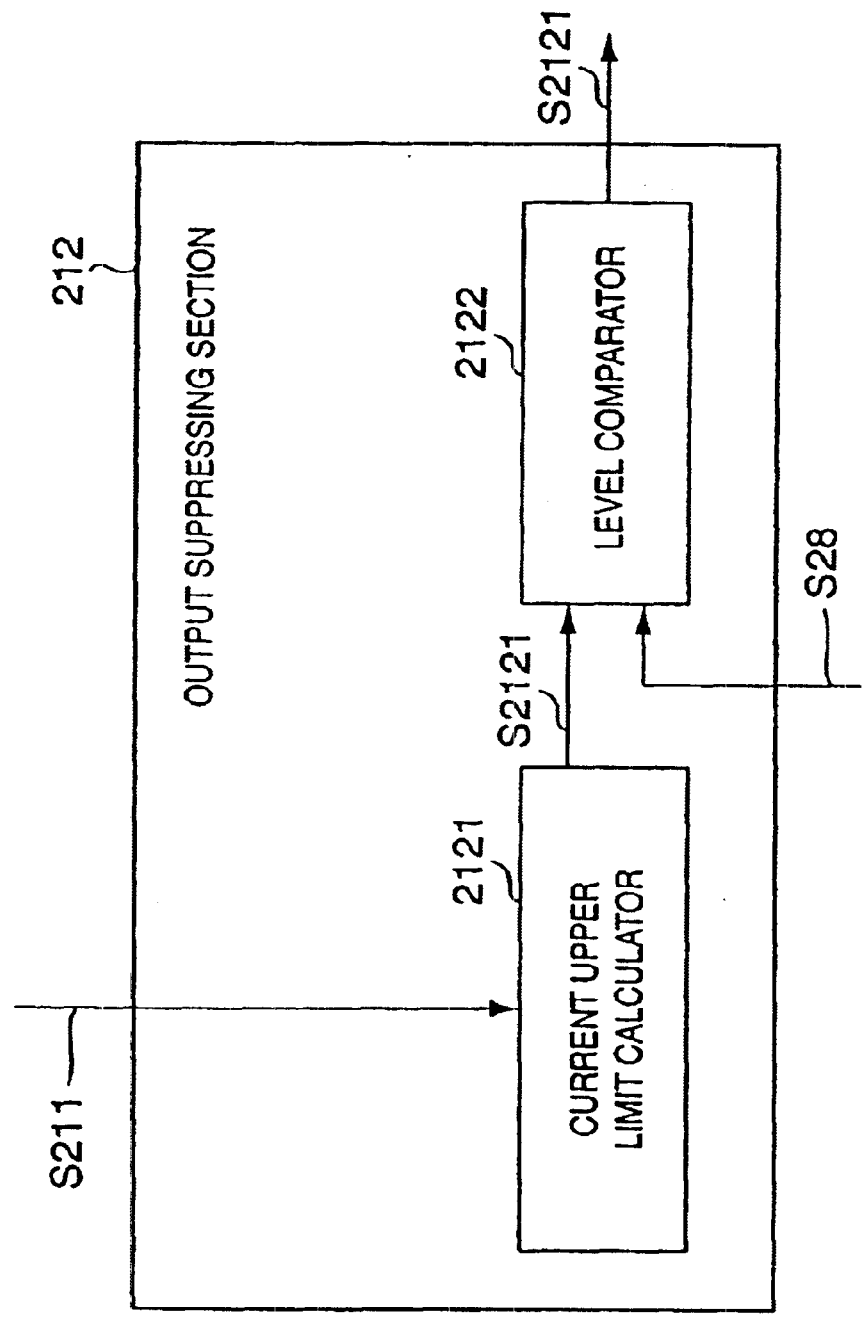

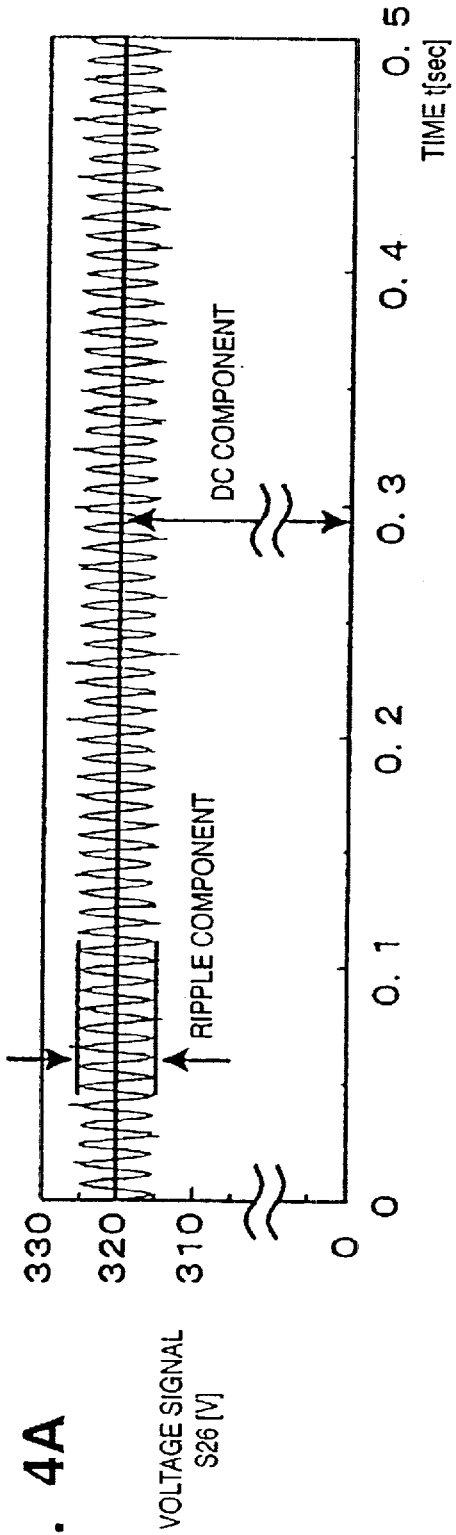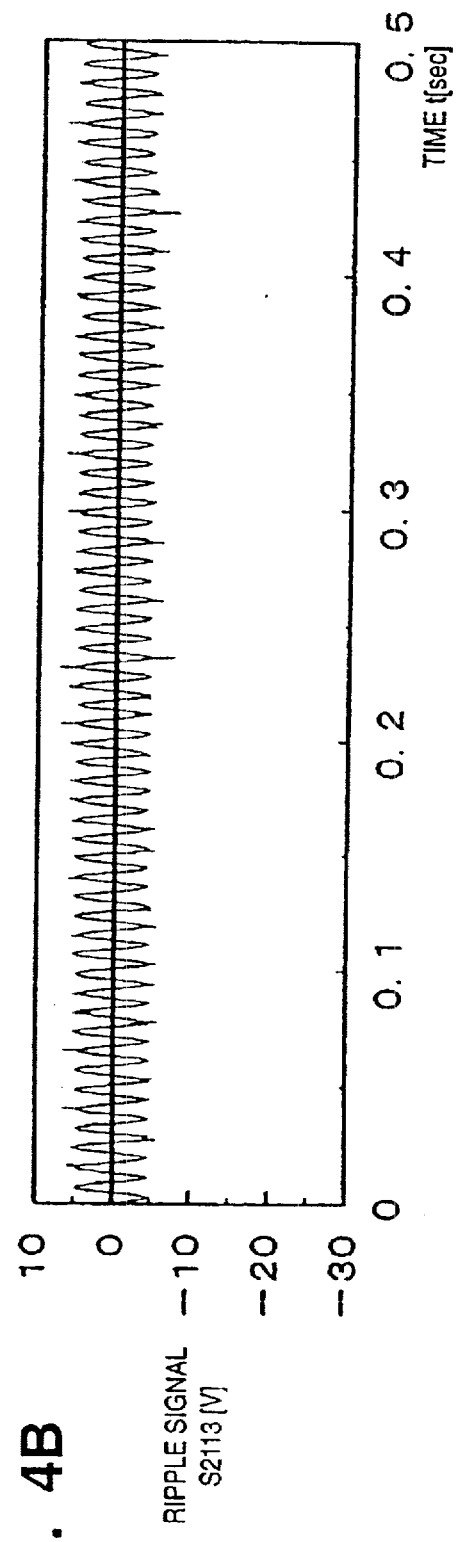

POWER CONVERTING APPARATUS, CONTROL METHOD THEREFOR, AND POWER GENERATION SYSTEM

FIELD OF THE INVENTION

The present invention relates to a power converting apparatus, control method therefor, and power generation system.

BACKGROUND OF THE INVENTION

Recently, home solar power generation systems which combine a solar battery of several kW to several ten kW and a power converting apparatus (voltage inverter) for converting DC power generated by the solar battery into AC power are proliferating.

A voltage inverter for converting DC power into AC power generally has a smoothing capacitor at the input section of the inverter main circuit. When the smoothing capacitor degrades, the electrostatic capacitance becomes low, resulting in an increase in ripple component of the DC current or voltage across the terminals of the smoothing capacitor. Hence, when the ripple component of a smoothing capacitor is detected, the service life of the smoothing capacitor can be determined, as disclosed in Japanese Patent Laid-Open No. 7-222436.

A conventional inverter is controlled such that upon detecting a degradation in smoothing capacitor, the operation of the inverter is stopped, and the resumption of the operation is inhibited until the degraded smoothing capacitor is exchanged.

In a solar power generation system having the above-described inverter, when the smoothing capacitor of the inverter degrades, the operation of the inverter is interrupted until the capacitor is exchanged. For this reason, some loss in amount of the power generation occurs inevitably in the solar power generation system.

SUMMARY OF THE INVENTION

The present invention has been made to solve the above-described problem of the prior art, and has as its object to provide a power converting apparatus, control method therefor, and power generation system, which can continue appropriate operation even when a smoothing capacitor degrades.

In order to achieve the above object, the present invention has the following arrangement.

That is, there is provided a power converting apparatus having a capacitor, comprising degradation determination means for determining a degradation in capacitor, and output suppressing means for, when the degradation determination means determines the degradation in capacitor, suppressing a maximum output value in the power converting apparatus.

For example, the output suppressing means preferably repeats suppression in units of predetermined suppression amounts until the maximum output value becomes not more than a predetermined value.

For example, when a sum of suppression amounts of the maximum output value exceeds a predetermined value, the output suppressing means preferably stops output of the power converting apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram showing the arrangement of an output suppressing section according to the embodiment;

FIGS. 4A and 4B are graphs for explaining a ripple component detected in the embodiment;

DETAILED DESCRIPTION OF THE PREFERRED EMBODIMENTS

Preferred embodiments of the present invention will now be described in detail in accordance with the accompanying drawings.

An embodiment of the present invention will be described below in detail with reference to the accompanying drawings.

First Embodiment

Outline of Invention

In this embodiment, in the power converting apparatus (inverter) of a solar power generation system, a degradation in smoothing capacitor is detected, and control for this purpose is executed.

In fine weather, 100% output is generally requested of the inverter of a solar power generation system. However, according to the studies of the present inventors, the standard solar radiation time in, e.g., Japan is only several % of the total operation time of the system. From this fact, even when the system is operated using a smoothing capacitor having an electrostatic capacitance that has decreased due to its expiring service life while limiting its output (while executing ripple suppression), the total power generation amount is probably not so seriously affected.

As a characteristic feature of this embodiment, on the basis of the fact that the inverter of a solar power generation system is not always used in the 100% output state, and rather, 100% output is rarely required, even when the smoothing capacitor degrades, the operation of the inverter is continued while suppressing its maximum output current. The ripple component in the DC current of the smoothing capacitor has a correlation with the inverter output. Hence, in this embodiment, the degradation in smoothing capacitor is determined on the basis of the ripple component.

System Arrangement

Figure 1:
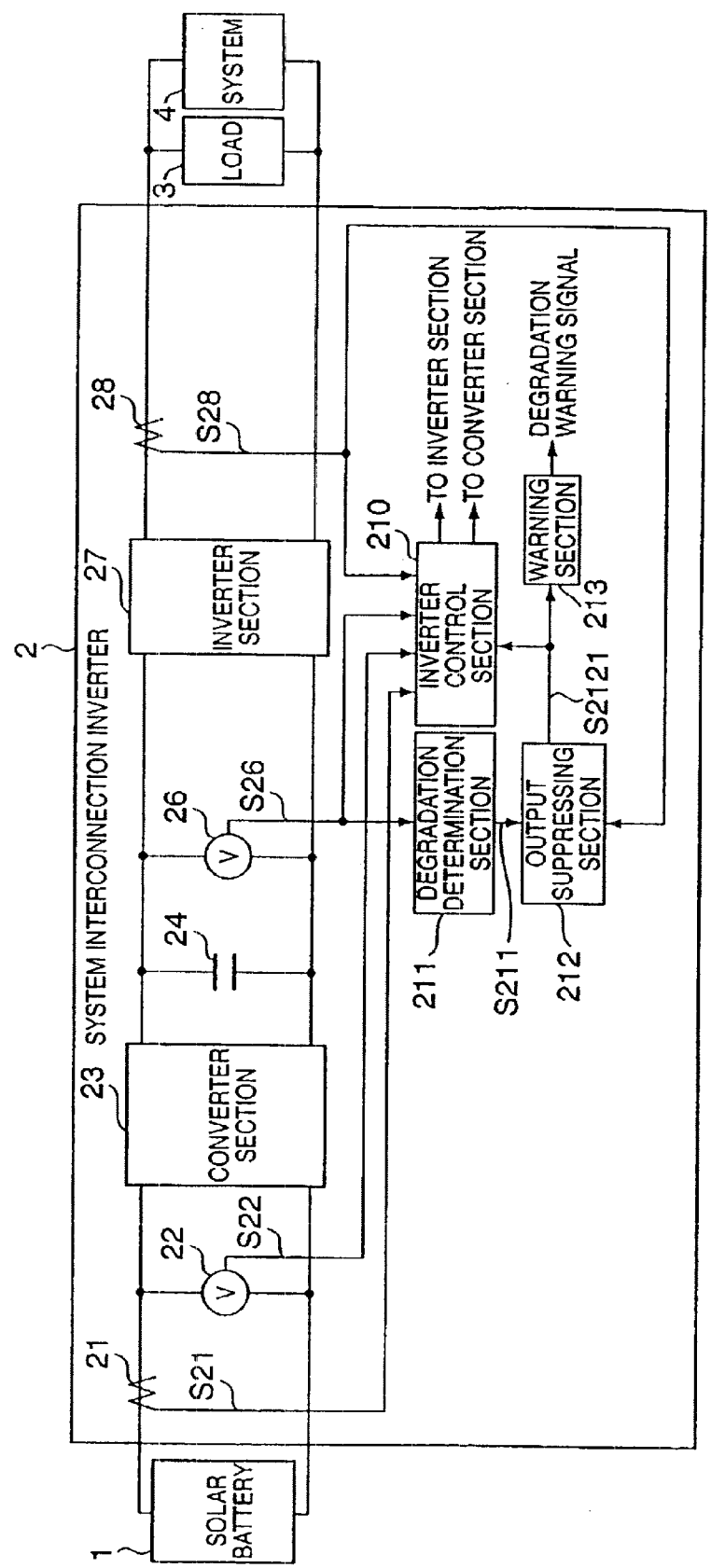
FIG. 1 is a block diagram showing the arrangement of a solar power generation system using an inverter according to the first embodiment of the present invention.

FIG. 1 is a block diagram showing the arrangement of a solar power generation system using a power converting apparatus (inverter) according to this embodiment. This system is constituted by a solar battery 1, system interconnection inverter 2, load 3, and system 4.

The solar battery 1 is made of amorphous silicon, crystallite silicon, polysilicon, a combination thereof, or a compound semiconductor. The solar battery 1 may be a DC power supply such as a primary battery, secondary battery, or fuel cell. A rectified output of an AC power supply such as a rotary power generator, or a combination of DC and AC power supplies may also be used. The DC or AC power supply can be either a voltage source or a current source. As the solar battery 1, an array structure is normally employed to obtain a desired voltage or current by combining a plurality of solar cell modules in parallel. However, the structure and size of the solar battery 1 itself are not important in this embodiment.

The load 3 may be a load that consumes power, such as an electrothermal load or motor load, or a system interconnection power generation system group including the load and another distributed system.

The system 4 is a 200-[V], 60-[Hz] commercial system. The system 4 may be connected to a system interconnection power generation system group of another distributed system or the load group.

The detailed arrangement of the system interconnection inverter 2 (to be simply referred to as an "inverter 2" hereinafter) will be described below.

The inverter 2 mainly comprises a current detection section 21, voltage detection section 22, converter section 23, capacitor 24, voltage detection section 26, inverter section 27, current detection section 28, inverter control section 210, degradation determination section 211, output suppressing section 212, and warning section 213.

The current detection section 21 detects the input DC current to the inverter 2 and outputs a current signal S21 to the inverter control section 210.

The voltage detection section 22 detects the input DC voltage to the inverter 2 and outputs a voltage signal S22 to the inverter control section 210.

The converter section 23 is a general chopper circuit formed from a capacitor, inductor, diode, switching element, and the like. The converter section 23 boosts the output voltage received from the solar battery to charge the capacitor 24. The converter section 23 also executes maximum power point tracking (to be referred to as "MPPT" hereinafter) of the solar battery 1.

The capacitor 24 is a smoothing capacitor which connects the output of the converter section 23 to the input of the inverter section 27.

The voltage detection section 26 detects the voltage across the terminals of the capacitor 24 and outputs a voltage signal S26 to the inverter control section 210 and degradation determination section 211.

The inverter section 27 is a general inverter circuit formed from a full-bridge circuit of an SW element, a filter reactor, and the like. The inverter section 27 switches the DC voltage, i.e., the voltage across the terminals of the capacitor 24, by the SW element, thereby outputting an AC voltage having a rectangular wave. Note that the filter reactor shapes the rectangular AC current waveform into a sinusoidal waveform.

The current detection section 28 detects the output current from the inverter section 27 and outputs a current signal S28 to the inverter control section 210 and output suppressing section 212.

The inverter control section 210 systematically controls the inverter 2, receives the current signals S21 and S28, the voltage signals S22 and S26, and a maximum output current instruction value signal S2121 from the output suppressing section 212, and outputs gate drive signals for the SW elements of the converter section 23 and inverter section 27.

The degradation determination section 211 receives the voltage signal S26, determines the degradation in capacitor 24, and outputs a degradation signal S211 to the output suppressing section 212.

To instruct the inverter 2 to suppress output power, the output suppressing section 212 receives the degradation signal S211 and current signal S28 and outputs the maximum output current instruction value signal S2121 to the inverter control section 210 and warning section 213.

Upon receiving the maximum output current instruction value signal S2121, the warning section 213 generates a degradation warning signal to warn the user of the degradation in capacitor 24. The warning section 213 outputs light, sound, or mechanical vibration, or an electrical signal or optical signal as the degradation warning signal, thereby transmitting information of the degradation in capacitor 24 to the user or information terminal. However, the transmission method is not limited to the above techniques, and any other method that can transmit information of the degradation (and/or forewarning about degradation) in capacitor 24 to the operator or information terminal can be used.

Note that each switching element in the converter section 23 or inverter section 27 is formed from a self-arc-suppressing SW element such as a power transistor, MOSFET (Metal Oxide Semiconductor Field Effect Transistor), IGBT (Insulated Gate Bipolar Transistor), GTO (Gate Turn Off) thyristor, or a combination thereof. The type of element is not particularly limited.

The control method for the inverter 2 will be described below in detail.

Normally, the inverter control section 210 monitors the voltage signal S26 and outputs a gate signal for controlling the output current of the inverter section 27 to the inverter section 27 such that the voltage signal S26 has a predetermined voltage. The inverter control section 210 also outputs a gate signal to the converter section 23 such that it boosts the output voltage of the solar battery 1 and executes MPPT of the solar battery 1. These control techniques are known, and a detailed description thereof will be omitted.

Characteristic constituent elements of the inverter 2 of the present invention are the degradation determination section 211 and output suppressing section 212. The detailed arrangements of these elements will be described below with reference to FIGS. 2 and 3.

Figure 2:
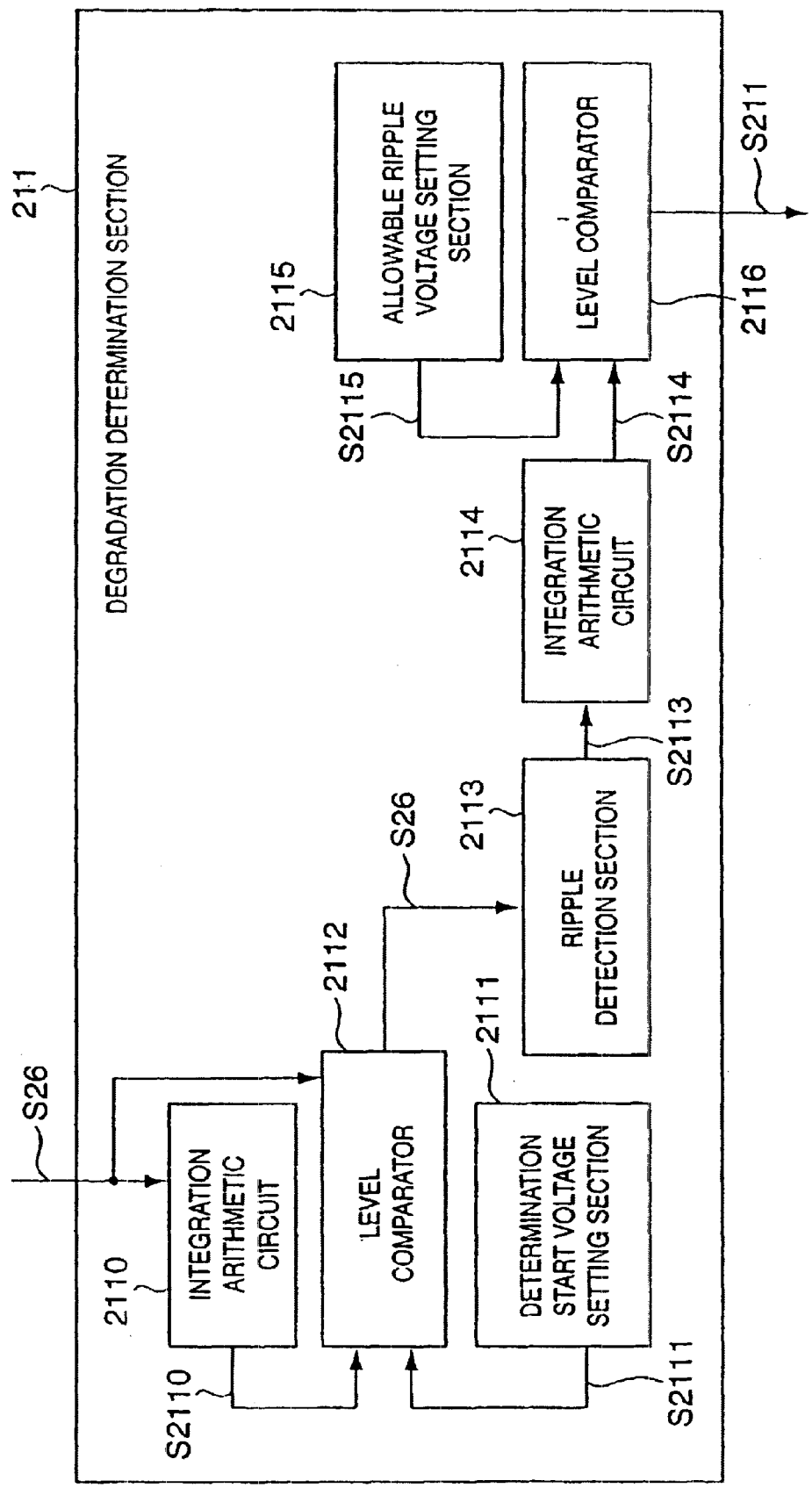
FIG. 2 is a block diagram showing the arrangement of a degradation determination section according to the embodiment.

FIG. 2 is a block diagram showing the functional arrangement of the degradation determination section 211. The degradation determination section 211 comprises an integration arithmetic circuit 2110, determination start voltage setting section 2111, level comparator 2112, ripple detection section 2113, integration arithmetic circuit 2114, allowable ripple voltage setting section 2115, and level comparator 2116.

The integration arithmetic circuit 2110 receives the voltage signal S26 detected by the voltage detection section 26 and outputs an integration result signal S2110 as the integration result to the level comparator 2112. The determination start voltage setting section 2111 sets a determination start voltage value as the threshold value of the voltage signal S26 which is used to determine the start of degradation determination for the capacitor 24, and outputs a start voltage signal S2111 to the level comparator 2112. The level comparator 2112 receives the integration result signal S2110, start voltage signal S2111, and voltage signal S26 and, when the integration result signal S2110 exceeds the start voltage signal S2111, outputs the voltage signal S26 to the ripple detection section 2113.

The ripple detection section 2113 outputs a result obtained by extracting a ripple component from the received voltage signal S26 to the integration arithmetic circuit 2114 as a ripple signal S2113. The integration arithmetic circuit 2114 outputs a ripple integration result signal S2114 as the integration result of the ripple signal S2113 to the level comparator 2116.

The allowable ripple voltage setting section 2115 sets the allowable upper limit value of the ripple component of the voltage signal S26 and outputs a ripple upper limit value signal S2115 to the level comparator 2116. The level comparator 2116 receives the ripple integration result signal S2114 and ripple upper limit value signal S2115. When the ripple integration result signal S2114 exceeds the ripple upper limit value signal S2115, the level comparator 2116 determines that the capacitor 24 has degraded, and outputs the degradation signal S211.

The ripple signal S2113 is integrated by the integration arithmetic circuit 2114 in each unit time. After the ripple integration result signal S2114 integrated in the unit time is output, the signal is temporarily cleared, and then, integration for the next unit time is started. Hence, comparison by the level comparator 2116 is executed at the unit time interval of integration by the integration arithmetic circuit 2114.

FIG. 3 is a block diagram showing the functional arrangement of the output suppressing section 212. The output suppressing section 212 comprises a current upper limit calculator 2121 and level comparator 2122.

Upon receiving the degradation signal S211 from the degradation determination section 211, the current upper limit calculator 2121 outputs to the level comparator 2122 the maximum output current instruction value signal S2121 that instructs suppression of one step shown in FIG. 7 (to be described later) for the maximum output current of the inverter 2.

The level comparator 2122 receives the maximum output current instruction value signal S2121 and current signal S28. When the current signal S28 is larger than the maximum output current instruction value signal S2121, the level comparator 2122 outputs the maximum output current instruction value signal S2121. With this operation, the maximum output current of the inverter 2 is suppressed by the maximum output current instruction value signal S2121.

The ripple extraction method of the ripple detection section 2113 of the degradation determination section 211 will be described with reference to FIGS. 4A and 4B. FIG. 4A shows the actual measurement value of the voltage signal S26 in this embodiment, in which the abscissa represents time t in unit [sec], and the ordinate represents the voltage signal S26 in unit [V]. FIG. 4B shows the actual measurement value of the ripple signal S2113, in which the abscissa represents time t in unit [sec], and the ordinate represents the ripple signal S2113 in unit [V]. In this embodiment, a ripple component is defined as a component obtained by subtracting the DC component from the voltage signal S26 in the steady operation mode, as shown in FIG. 4A. That is, the voltage component shown in FIG. 4B is obtained as the ripple component of the voltage signal S26.

Generally, the ripple component superposed on the voltage across the terminals of the capacitor 24 is generated in accordance with switching of the inverter section 27. For this reason, the frequency of the ripple component is normally an integer multiple of the frequency of the AC output of the inverter section 27 (if the AC output has a predetermined frequency, the ripple component also has a predetermined frequency). Hence, when the ripple component is extracted by known FFT (Fast Fourier Transform) analysis or the like in the degradation determination section 211, only the ripple component can be accurately extracted, and the above-described degradation determination can be more accurately done.

To make the solar battery 1 output more power generation amount to be input to the inverter 2, the above-described maximum output current suppression amount of one step is preferably set as finely as the capability of the inverter control section 210 and the like allows. For example, in a test to be described later, the suppression amount of one step was set to 0.225 [A].

The degradation determination section 211 or output suppressing section 212 may be incorporated in the inverter control section 210, and in fact, such an arrangement is preferably employed. This is because the inverter control section 210 has an arithmetic processing unit and memory to execute digital control using a microcomputer, and the degradation determination section 211 and output suppressing section 212 can easily be implemented using these components.

Control Flow Chart

Figure 5:
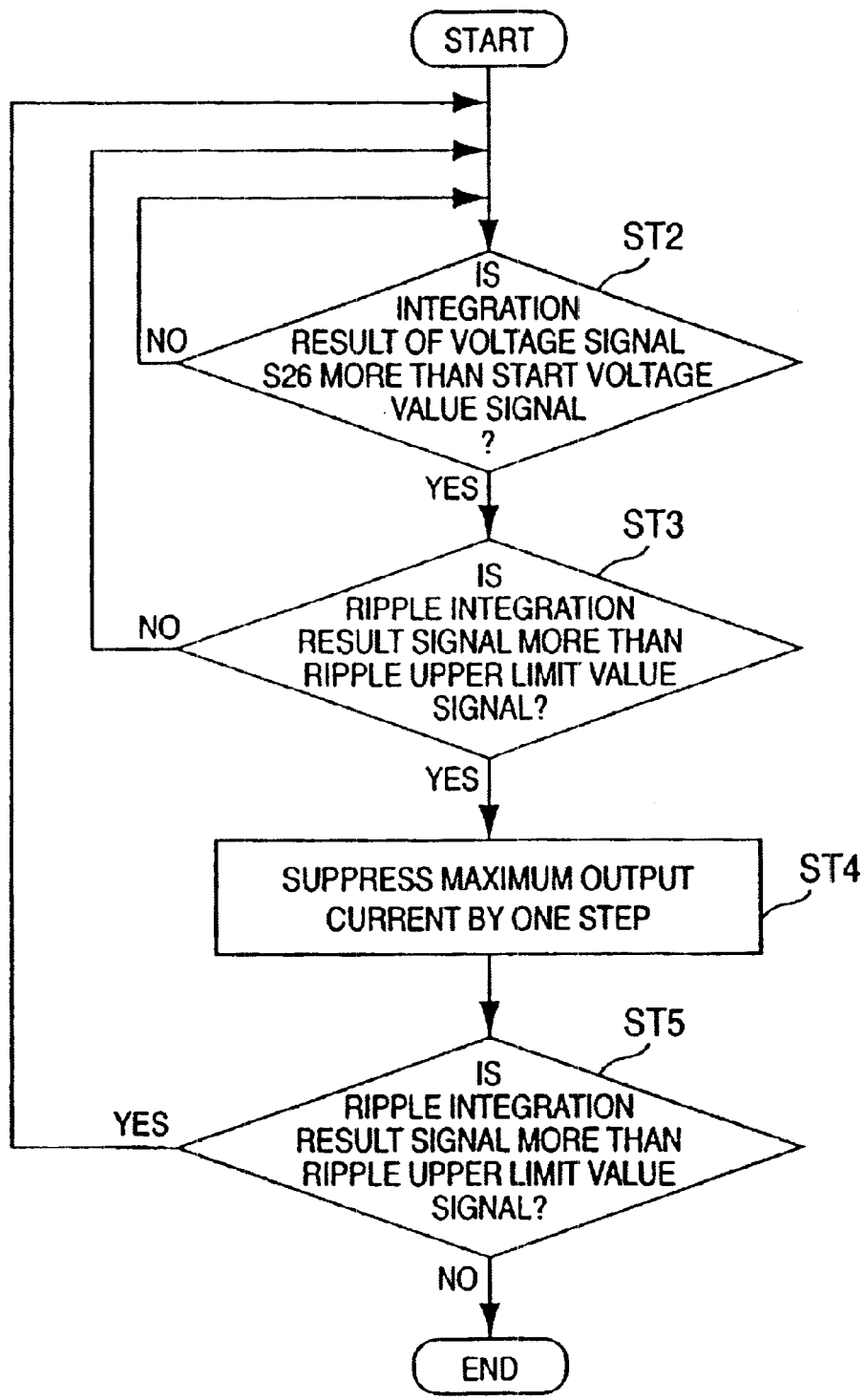
FIG. 5 is a flow chart showing an output current control method according to the embodiment.

Control in the above-described embodiment will be described in detail with reference to FIG. 5. FIG. 5 is a flow chart showing the output current control method for the inverter 2 according to this embodiment.

First, it is determined in step ST2 whether the inverter 2 is in the steady operation mode. More specifically, the level comparator 2112 shown in FIG. 2 determines whether the integration result of the voltage signal S26 (integration result signal S2110) exceeds the start voltage signal S2111. If YES in step ST2, the voltage across the terminals of the capacitor 24 exceeds the predetermined determination start voltage, and it is therefore determined that the inverter 2 is in the steady operation mode. The flow advances to step ST3. If NO in step ST2 (the integration result signal S2110 does not exceed the start voltage signal S2111), the processing returns to step ST2.

In step ST3, the level comparator 2116 determines whether the ripple integration result signal S2114 exceeds the ripple upper limit value signal S2115. If YES in step ST3, the flow advances to step ST4; otherwise, the flow returns to step ST2.

In step ST4, the maximum output current of the inverter 2 is suppressed by one step, as will be described later.

It is determined again in step ST5 whether the ripple integration result signal S2114 exceeds the ripple upper limit value signal S2115. If YES in step ST5, the flow returns to step ST2; otherwise, the suppressing operation is ended.

With the above-described output current suppressing control, i.e., when degradation determination for the capacitor 24 is executed using the ripple integration result signal S2114, and a degradation is detected, control is done such that the ripple integration result signal S2114 becomes equal to or smaller than the ripple upper limit value signal S2115 whereby the maximum output current of the inverter 2 is suppressed.

Figure 6A:
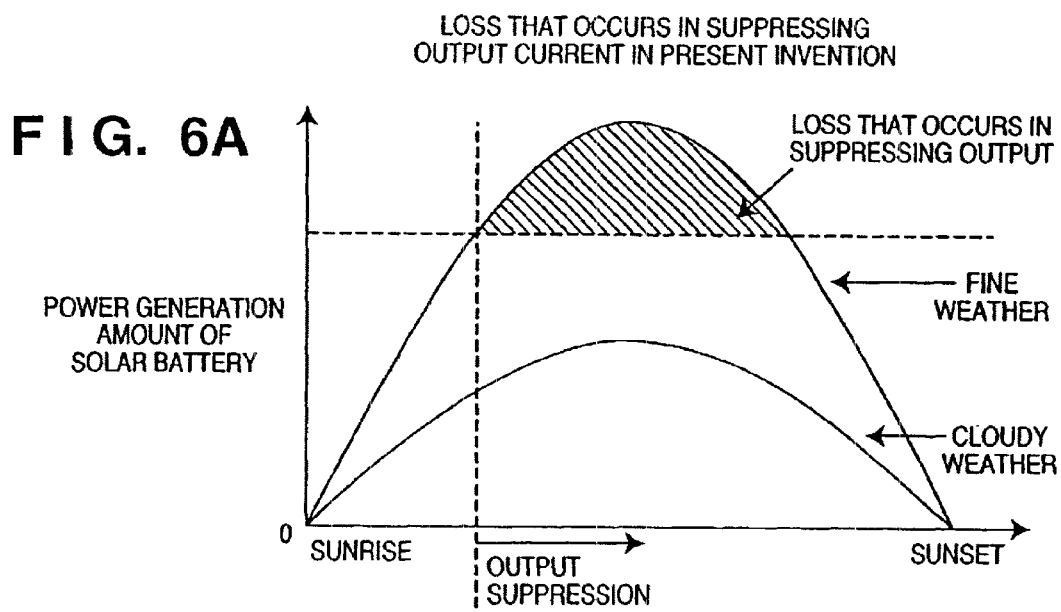
FIGS. 6A and 6B are views for explaining the loss in power generation amount in the embodiment.
Figure 6B:
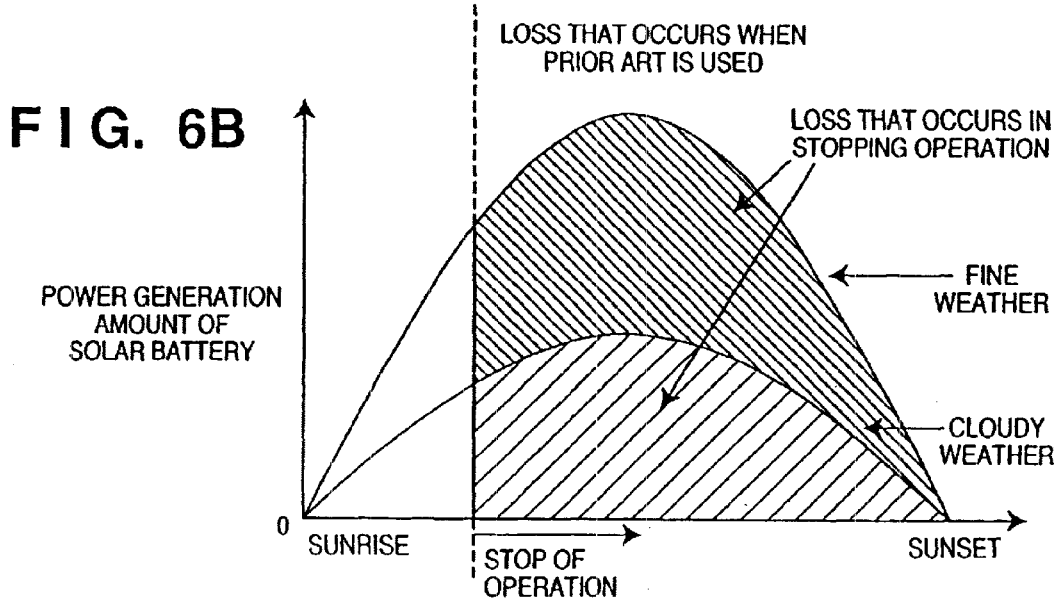

The effect obtained by the above-described maximum output current control will be described with reference to FIGS. 6A and 6B. FIGS. 6A and 6B are views showing the concept of the amount of loss in power generated by the solar battery 1 in a day due to output current suppression in the solar power generation system of this embodiment. FIG. 6A shows the loss amount by output current suppression in the solar power generation system of this embodiment. FIG. 6B shows the loss amount by operation stop of a conventional solar power generation system. Referring to FIGS. 6A and 6B, the abscissa represents the elapse of time in a day (from sunrise to sunset), and the ordinate represents power generated by the solar battery.

As shown in FIG. 6A, a power loss by output current suppression of this embodiment occurs only near the peak of power generation amount in the daytime. On the other hand, as shown in FIG. 6B, when the operation of the inverter is stopped as the smoothing capacitor degrades, the amount of power to be generated from that time, or in some cases, most of the power to be generated the day is lost.

In addition, in this embodiment, the amount of power generation corresponding to the ripple upper limit value signal S2115 is lost. For this reason, as is apparent from FIG. 6A, when the power generation amount is small all day because of, e.g., cloudy weather, no loss is generated at all. This also applies to the power generation amount throughout a year.

As described above, in this embodiment, even when the capacitor 24 degrades, the operation of the inverter is continued while suppressing the maximum output current of the inverter 2, thereby suppressing any loss in power generation amount of the solar battery 1.

Operation Check (Test Result)

A test result of control of the above-described embodiment will be described. Under the following conditions, operation (normal operation) of causing the solar battery 1 to output DC power, causing the converter section 23 to boost the DC power, and causing the inverter section 27 to convert the DC power into commercial AC power and supply it to the load 3 or system 4 was tested.

[Test Conditions]

Test conditions will be described first.

As shown in FIG. 4A, since the voltage across the terminals of the capacitor 24 in the steady operation mode of the inverter 2 is about 320 [V], the voltage across the terminals of the capacitor 24 at which degradation determination is started, i.e., the start voltage signal S2111 was set to 300 [V] (320 [V] and a margin of 20 [V]). The margin is not particularly limited to this value and can be set within a range that generates no error in degradation determination.

Since a ripple component superposed on the voltage across the terminals of the capacitor 24 is generally output as a strain in output waveform of the inverter 2, the ripple upper limit value signal S2115 must be set within a range where the strain ratio becomes lower than the allowable level of the load 3. In this embodiment, the capacitor 24 was replaced with capacitors having various electrostatic capacitances, the ripple component in each capacitor and the ripple component contained in the output waveform of the inverter 2 were measured, and 4 [V] was selected as the ripple upper limit value signal S2115 which satisfied a strain ratio of 3% and a total strain ratio of 5% of the output current waveform.

In a normal system, a capacitor 24 having an electrostatic capacitance of 1,000 [$\mu$F] is replaced with a capacitor having an electrostatic capacitance of 900 [$\mu$F], thereby simulating a decrease in electrostatic capacitance due to a degradation in capacitor 24.

As the remaining test conditions, the output of the solar battery 1 was 4.7 [kW], the power generation amount of the inverter 2 was 4.5 [kW], the output current (maximum output current of the inverter 2) was 22.5 [A], and the output voltage was 200 [V] (constant). The above-described maximum output current suppression amount of one step was set to 1% of the maximum output current of 22.5 [A], i.e., 0.225 [A] as finely as the capability of the inverter control section 210 and the like allowed. As the warning section 213, a red LED (Light Emitting Diode) was used.

[Test Result]

The output current suppressing operation of this embodiment was checked by simulating the degraded state of the capacitor 24 under the above-described conditions. The result is shown in FIG. 7.

Figure 7:
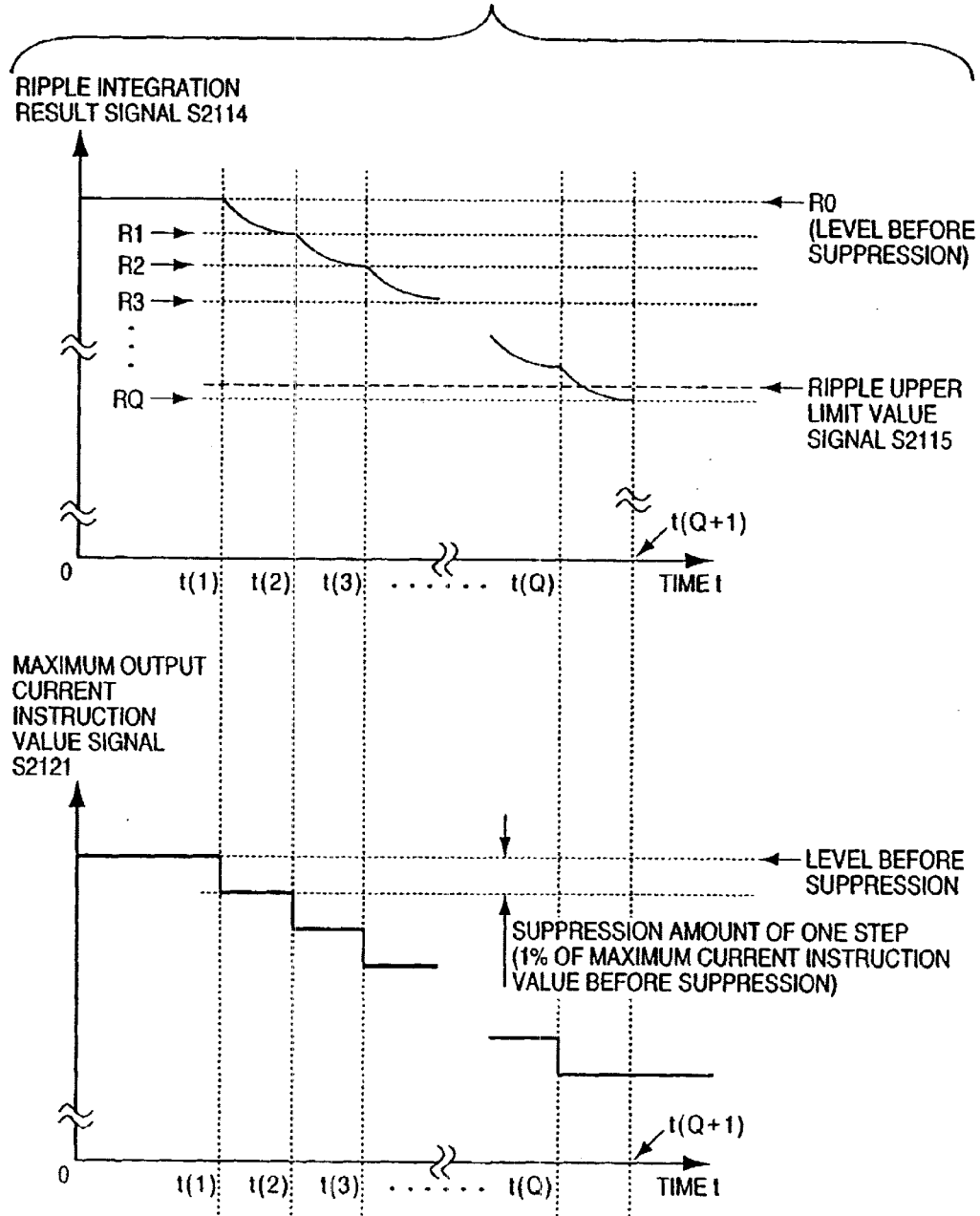
FIG. 7 is a timing chart showing the test result of output current suppressing operation of the embodiment.

FIG. 7 is a timing chart showing the time transitions of the maximum output current instruction value signal S2121 and ripple integration result signal S2114 (ordinate) in the test respectively on the upper and lower sides, respectively. The abscissa represents the time t.

In this test, the degradation determination section 211 was powered on at time t(1). Simultaneously, the maximum output current instruction value signal S2121 for instructing the first suppression of one step was output from the output suppressing section 212 whereby the maximum output current of the inverter 2 was suppressed by 1% (one step) of the maximum output current before suppression.

From the time t(1) to t(2), the level of the ripple integration result signal S2114 lowered from R0 to R1.

After that, the above operation was repeated to suppress the maximum output current of the inverter 2 every 1%. Hence, from time t(Q) to t(Q+1), the ripple integration result signal S2114 lowered to RQ, i.e., a level less than the ripple upper limit value signal S2115.

At this time, the series of control operations related to output suppression were ended, and the inverter 2 continued its operation. Simultaneously with the output of the maximum output current instruction value signal S2121, a degradation warning signal was generated to turn on the LED, thereby notifying the user of the degradation in capacitor 24.

A period T (=t(2)−t(1)) at which the maximum output current instruction value signal S2121 is output from the output suppressing section 212 depends on the processing speed of the inverter control system including the degradation determination section 211, output suppressing section 212, and inverter control section 210. Generally, since the output suppressing operation in the present invention requires no high speed, the period T can be 0.01 to 0.1 [sec]. In the experiment, T=0.1 [sec] in consideration of the output suppression amount and the processing capability of the inverter control system.

As described above, according to this embodiment, even when a degradation in smoothing capacitor in the inverter of the solar power generation system is detected, the operation is continued while suppressing the maximum output current value, thereby effectively using input power from the solar battery.

In addition, the efficiency of smoothing capacitor exchange operation can be increased by warning the user about a degradation in smoothing capacitor.

In this embodiment, a degradation in capacitor 24 is determined on the basis of a ripple component superposed on the voltage across the terminals of the capacitor 24. However, the degradation may be determined using the ripple current of the capacitor 24.

In addition, as disclosed in Japanese Patent No. 2960469, the temperature of the capacitor 24 may be measured, a degradation determination reference may be set to determine the degradation in capacitor 24 when the measured temperature exceeds a preset temperature, and degradation determination may be executed on the basis of the measurement result of the increase in temperature. When the increase in temperature of the capacitor 24 is observed, a malfunction of the capacitor can also be detected. Hence, a safer power converting apparatus can be provided.

The essential characteristic of the present invention is to suppress the maximum output (or simply the output) of the inverter 2 when the capacitor 24 degrades. Hence, the positions and components of the above constituent elements can be arbitrarily changed without departing from the essential characteristic of the present invention. However, the degradation in capacitor 24 in the present invention includes certain abnormalities such as a malfunction of the capacitor 24.

In this embodiment, a system interconnection system has been exemplified. However, the present invention can also be applied to a standalone system without any system interconnection.

Second Embodiment

The second embodiment of the present invention will be described below.

In the second embodiment, a degradation in capacitor 24 is determined on the basis of the ripple component of the voltage across the terminals of the capacitor 24, and if a degradation is determined, the maximum output current is suppressed such that a ripple integration result signal S2114 becomes equal to or less than a ripple upper limit value S2115, as in the above-described first embodiment.

In the second embodiment, in repeating the suppressing operation of the first embodiment, when the sum of suppression amounts exceeds a predetermined ratio of the maximum output current value before suppression, it is determined that the service life of the capacitor 24 is already going to expire. As a characteristic feature, if it is determined that the service life of the capacitor 24 is going to expire, the operation of the inverter is stopped to remove it from the load and system, and a service life warning signal is output from a warning section 213.

Notable differences between the second embodiment and the first embodiment will be described below in detail. The same reference numerals as in the above-described first embodiment denote the same components in the second embodiment, and a repetitive description thereof will be omitted.

System Arrangement

Figure 8:
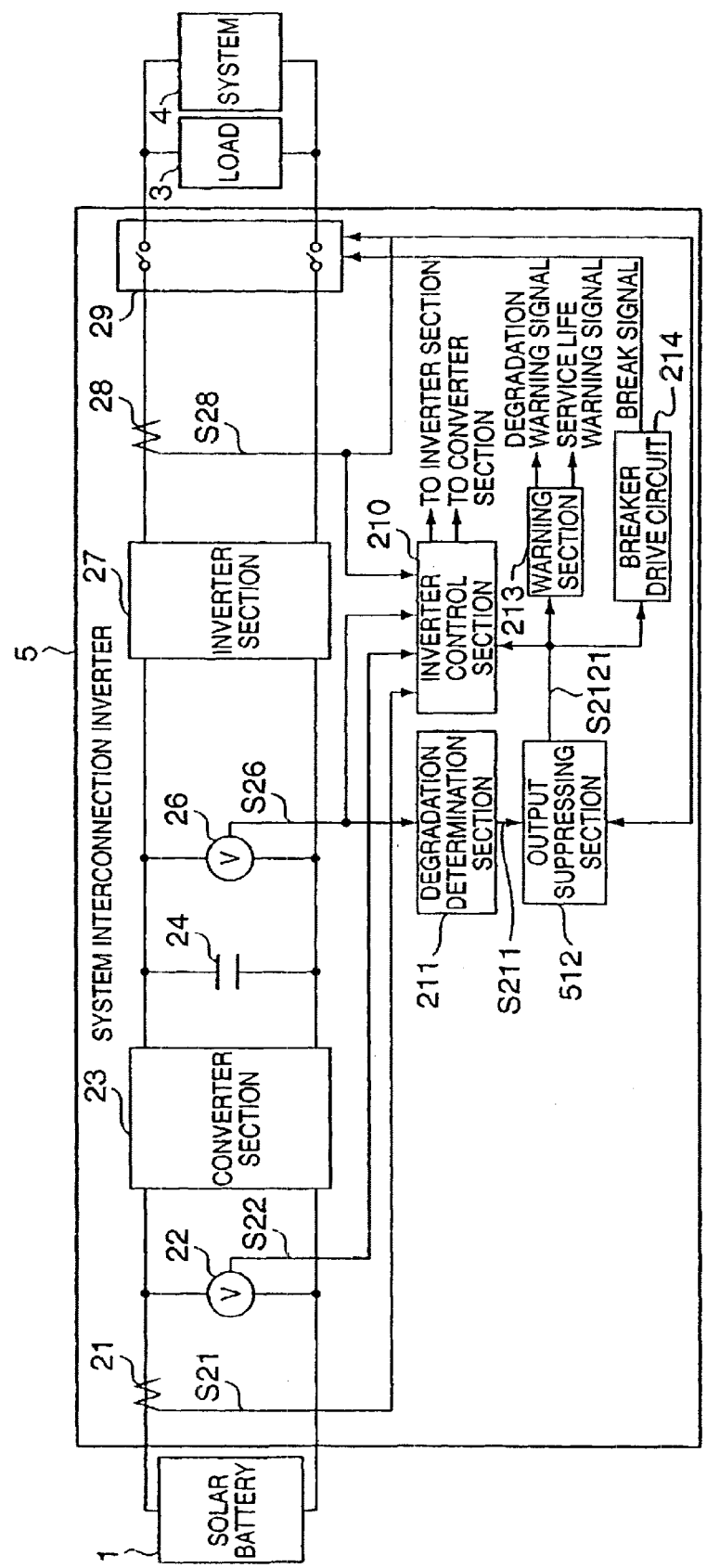
FIG. 8 is a block diagram showing the arrangement of a solar power generation system using an inverter according to the second embodiment of the present invention.

FIG. 8 is a block diagram showing the arrangement of a solar power generation system using an inverter 5 according to the second embodiment.

To instruct suppression of the output power of the inverter 5, an output suppressing section 512 receives a degradation signal S211 and current signal S28 and outputs a maximum output current instruction value signal S2121 to an inverter control section 210, warning section 213, and breaker drive circuit 214.

Upon receiving the maximum output current instruction value signal S2121, the warning section 213 generates a degradation warning signal to warn the user of a degradation in capacitor 24. Upon receiving the maximum output current instruction value signal S2121 which nullifies the maximum output current, the warning section 213 generates a service life warning signal.

The breaker drive circuit 214 serves as a drive circuit for a breaker 29. Upon receiving the maximum output current instruction value signal S2121 which nullifies the maximum output current, the breaker drive circuit 214 outputs a break signal to the breaker 29.

The breaker 29 serves as a cut-off means for the inverter 5, which is driven by the breaker drive circuit 214 to remove the inverter 5 from a load 3 and system 4. The breaker 29 can employ any type of break means such as a mechanical switch or semiconductor switch.

Figure 9:
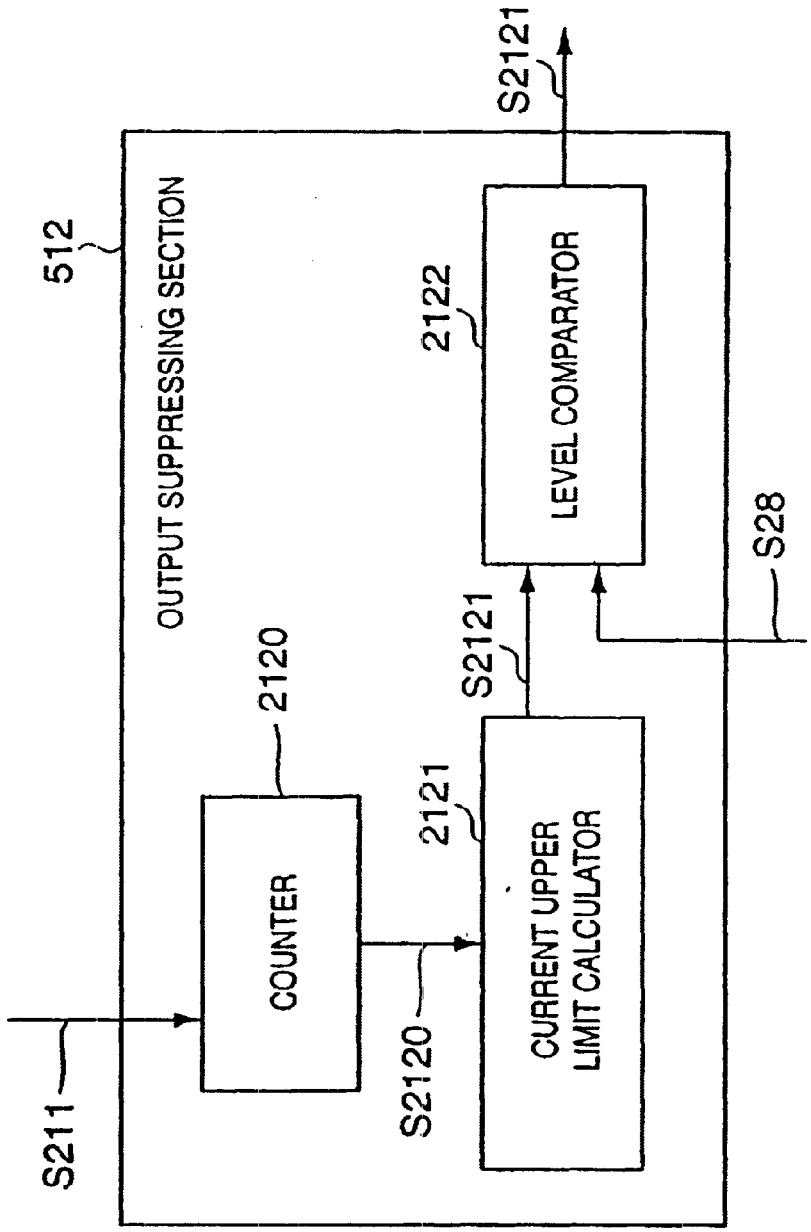
FIG. 9 is a block diagram showing the arrangement of an output suppressing section according to the second embodiment.

FIG. 9 is a block diagram showing the functional arrangement of the output suppressing section 512. The output suppressing section 512 comprises a counter 2120, current upper limit calculator 2121, and level comparator 2122.

The counter 2120 receives the degradation signal S211 from a degradation determination section 211, counts a number n of times of input, and outputs the count result to the current upper limit calculator 2121 as a count signal S2120.

The current upper limit calculator 2121 receives the count signal S2120, and for every increment in count value, outputs to the level comparator 2122 the maximum output current instruction value signal S2121 that instructs suppression of one step shown in FIG. 11 (to be described later) for the maximum output current. Upon receiving the count signal S2120 indicating n=31, the current upper limit calculator 2121 outputs the maximum output current instruction value signal S2121 which nullifies the maximum output current.

The level comparator 2122 receives the maximum output current instruction value signal S2121 and current signal S28 and, when the current signal S28 is larger than the maximum output current instruction value signal S2121, outputs the maximum output current instruction value signal S2121.

Control Flow Chart

Figure 10:
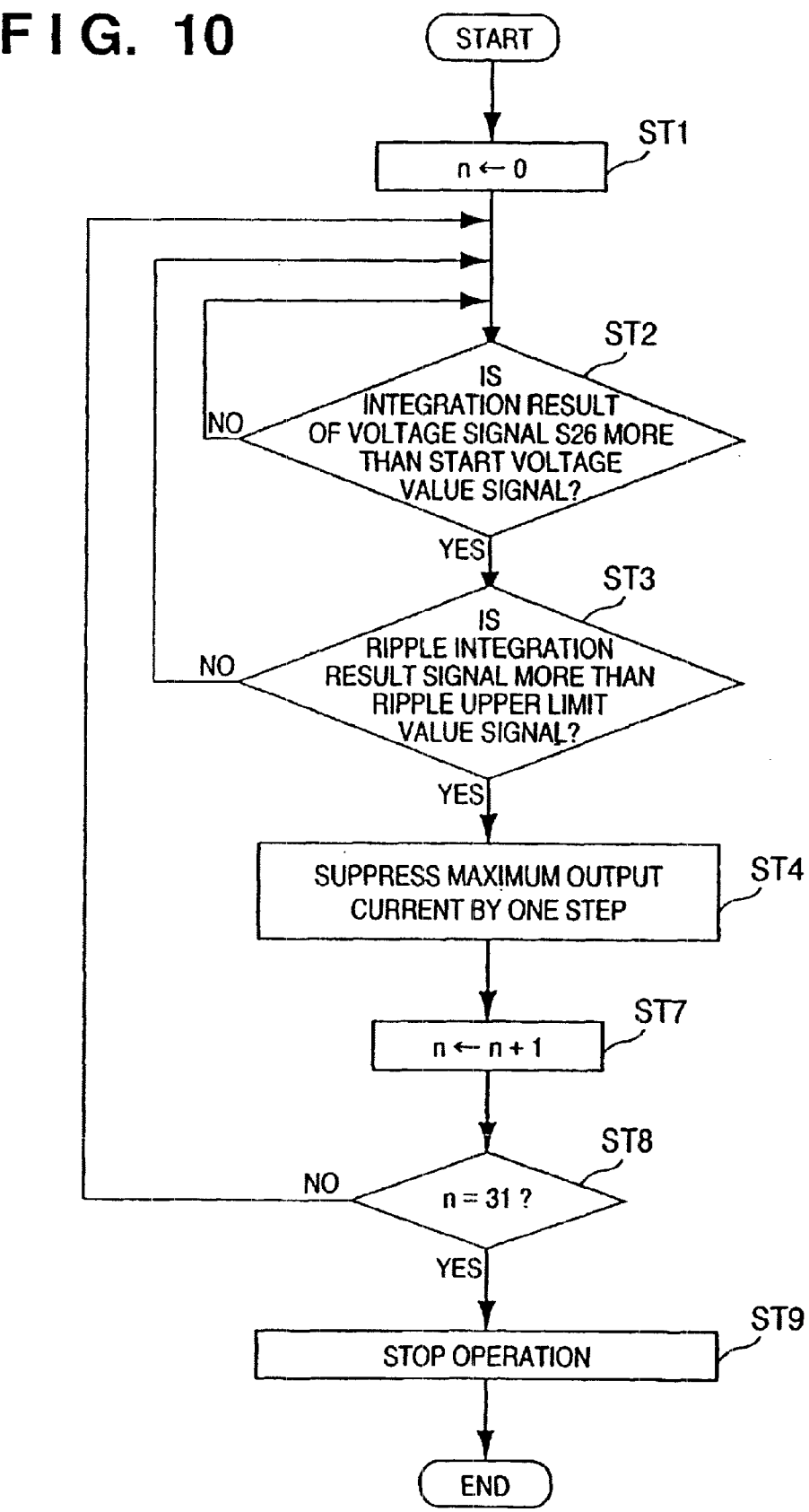
FIG. 10 is a flow chart showing an output current suppressing method according to the second embodiment.

FIG. 10 is a flow chart showing an output current suppressing method for the inverter 5 according to the second embodiment.

First, in step ST1, the count n of the counter 2120 is cleared to zero. The same maximum output current control (ST2 to ST4) as in the first embodiment is executed, and then, the count n is incremented by one in step ST7. In step ST8, if the count n is 31, the flow advances to step ST9; otherwise, the flow returns to step ST2.

Referring to FIG. 10, every time the maximum output current is suppressed by one step by the output suppressing section 512 (ST4), the count n in the counter 2120 is incremented by one (ST7). In the second embodiment, the suppression amount of one step is set to 1% of the maximum output current value before suppression, as in the first embodiment. Hence, when it is determined in step ST8 that n=31, it is determined that the total suppression amount has exceeded a value corresponding to n=30, i.e., 30% of the maximum output current before suppression.

If the total suppression amount exceeds 30%, the operation of the inverter 5 is stopped in step ST9.

With the above processing, the inverter 5 is controlled such that the ripple integration result signal S2114 becomes equal to or less than the ripple upper limit value signal S2115 so that the maximum output current is suppressed. After that, when the ripple integration result signal S2114 exceeds the ripple upper limit value signal S2115 again, the same suppressing operation is repeated. When the sum of suppression amounts of the output current, i.e., the total suppression amount exceeds a predetermined ratio (30% here) of the maximum output current before suppression, the operation of the inverter 5 is stopped.

As the limit of the suppression amount of the output current, 30% before suppression is set. However, any other value can be used as long as it is set in consideration of the service life of the capacitor. Hence, the limit value of the suppression amount is not limited to the above value.
Operation Check (Test Result)

A test result of control of the second embodiment will be described below. The test was executed basically under the same conditions as in the above-described first embodiment except that the capacitance of the capacitor 24 for the test was set to 500 [$\mu$F].
[Test Result]

Figure 11:
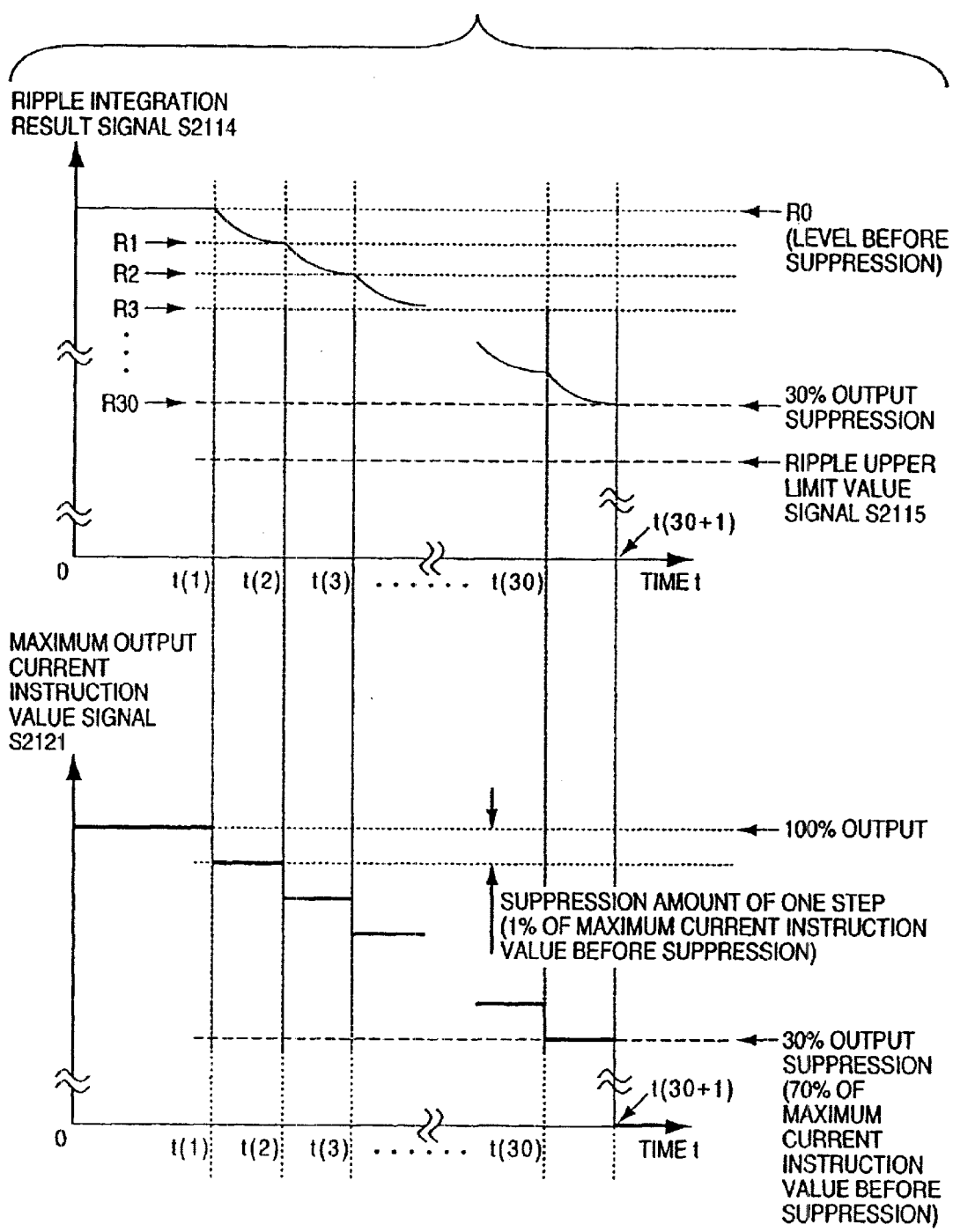
FIG. 11 is a timing chart showing the test result of output current suppressing operation of the second embodiment.

The check test result of output current suppressing operation in the second embodiment is shown in FIG. 11. Like FIG. 7 in the first embodiment, FIG. 11 is a timing chart showing the time transitions of the maximum output current instruction value signal S2121 and ripple integration result signal S2114 (ordinate) in the test respectively on the upper and lower sides, respectively.

In this test as well, the degradation determination section 211 was powered on at time t(1). After that, as the maximum output current instruction value signal S2121 for instructing suppression of one step (1% of the maximum output current value before suppression) was output from the output suppressing section 512, the suppressing operation was repeated 31 times whereby the level of the ripple integration result signal S2114 lowered from R0 to R30 from time t(1) to t(31).

The level R30 of the ripple integration result signal S2114 is higher than that of the ripple upper limit value signal S2115 but corresponds to a value more than 30% of the initial maximum output current. Hence, when the 31st suppressing operation was ended at the time t(31), the maximum output current instruction value signal S2121 which nullifies the maximum output current was output from the output suppressing section 512 to stop the operation of the inverter 5. In addition, the inverter 5 was removed from the load 3 and system 4 by the breaker 29.

In this test as well, simultaneously with the output of the maximum output current instruction value signal S2121, a degradation warning signal was generated by the warning section 213 to turn on the LED, thereby notifying the user of a degradation in capacitor 24. In addition, simultaneously with the output of the maximum output current instruction value signal S2121 which nullifies the maximum output current, a service life warning signal was generated to blink the LED, thereby notifying the user that the service life of the capacitor 24 was going to expire.

As described above, according to the second embodiment, when a degradation in smoothing capacitor in the inverter of the solar power generation system is detected, the operation is continued while suppressing the maximum output current value. Additionally, when the sum of the suppression amounts exceeds a predetermined ratio of the maximum output current value before suppression, it is determined that the service life of the capacitor is going to expire, and the operation of the inverter is stopped. With these arrangements, a safer inverter can be provided.

Furthermore, the efficiency of smoothing capacitor exchange operation can be increased by warning the user that the service life of the smoothing capacitor is going to expire.

In the second embodiment as well, the degradation in capacitor 24 is determined on the basis of comparison between the ripple integration result signal S2114 and the ripple upper limit value signal S2115, as in the first embodiment. However, the degradation may be determined on the basis of the time integration value of the ripple current.

Third Embodiment

The third embodiment of the present invention will be described below.

Figure 12:
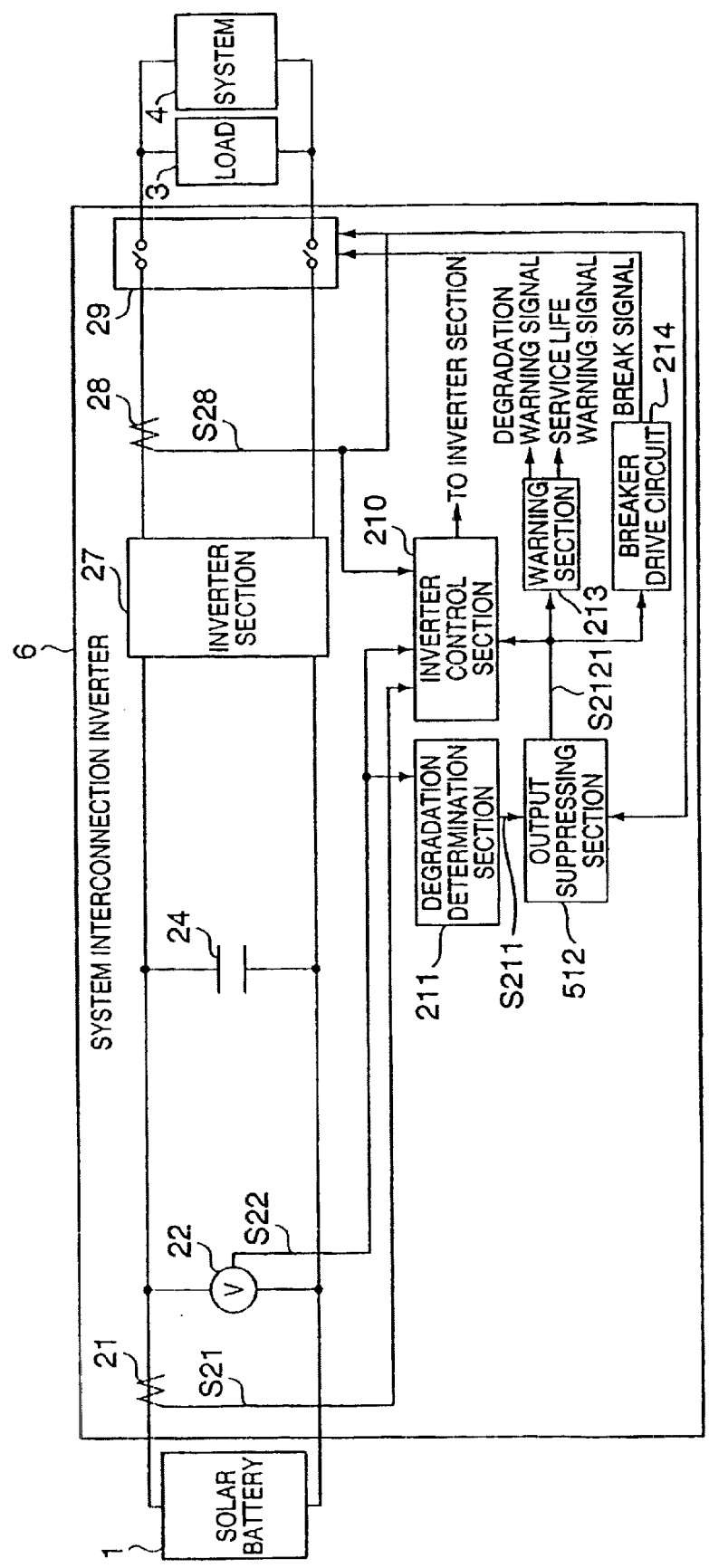
FIG. 12 is a block diagram showing the arrangement of a solar power generation system using an inverter according to the third embodiment of the present invention.

FIG. 12 is a block diagram showing the arrangement of a solar power generation system using an inverter 6 according to the third embodiment. The same reference numerals as in FIG. 8 described in the above-described second embodiment denote the same components in FIG. 12, and a description thereof will be omitted.

An especially different point between the second and the third embodiments will be described below.

As characteristic features of the inverter 6 of the third embodiment, it has no converter section 23, and a degradation in capacitor 24 is determined using a voltage signal S22.

A voltage detection section 22 detects the input DC voltage to the inverter 6 (the voltage across the terminals of the capacitor 24) and outputs it to an inverter control section 210 and degradation determination section 211 as the voltage signal S22. Control for the degradation determination processing of the capacitor 24 by the degradation determination section 211 is the same as in the above-described second embodiment except that the input signal is the voltage signal S22, and a detailed description thereof will be omitted.

The inverter control section 210 is a means for controlling the inverter 6, i.e., an inverter section 27, which receives an current signal S21, current signal S28, voltage signal S22, voltage signal S26, and maximum output current instruction value signal S2121 and outputs a gate drive signal for the SW element of the inverter section 27.

In the third embodiment, MPPT of a solar battery 1 is executed by the inverter section 27. This control technique is known, and a detailed description thereof will be omitted. However, since the voltage across the terminals of the capacitor 24 varies due to the MPPT operation, ripple component extraction in the degradation determination section 211 can be more effectively done by using FFT analysis or the like.
Operation Check (Test Result)

A test result of control of the third embodiment will be described below. The test was executed under the same conditions as in the above-described first embodiment.
[Test Result]

As a result of check test of output current suppressing operation in the third embodiment, as in the above-described second embodiment, suppressing operation of the maximum output current of the inverter 6 was repeated 31 times. At time t(31) when the total suppression amount of the output current exceeded 30% of the initial maximum output current for the first time, the maximum output current instruction value signal S2121 which nullifies the maximum output current was output from an output suppressing section 512 to stop the operation of the inverter 6. In addition, the inverter 6 was removed from a load 3 and system 4 by a breaker 29.

In this test as well, simultaneously with the output of the maximum output current instruction value signal S2121, a degradation warning signal was generated by a warning section 213 to turn on the LED, thereby notifying the user of the degradation in capacitor 24. In addition, simultaneously with the output of the maximum output current instruction value signal S2121 which nullifies the maximum output current, a service life warning signal was generated to blink the LED, thereby notifying the user that the service life of the capacitor 24 was going to expire.

As described above, according to the third embodiment, even when a degradation in capacitor is determined on the basis of the input DC voltage to the inverter, output current control can be appropriately executed, so the same effect as in the second embodiment can be obtained.

In the third embodiment, a degradation in capacitor 24 is determined on the basis of the voltage signal S22. However, the determination may be done using the current signal S21.

The present invention may be applied to a system constituted by a plurality of devices (e.g., a solar battery, inverter unit, host computer, interface device, and other electronic devices) or an apparatus comprising a single device (e.g., an apparatus incorporating a solar battery).

The object of the present invention is achieved even by supplying a storage medium (or recording medium) which stores software program codes for implementing the functions of the above-described embodiments to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

As has been described above, according to the present invention, a power converting apparatus, a control method therefor, and a solar power generation system which continue appropriate operation even when a smoothing capacitor degrades can be provided.

As many apparently widely different embodiments of the present invention can be made without departing from the spirit and scope thereof, it is to be understood that the invention is not limited to the specific embodiments thereof except as defined in the appended claims.

What is claimed is:

1. A power converting apparatus having a capacitor, comprising:
   a degradation determination section arranged to determine a degradation in the capacitor; and
   an output suppressing section arranged to, while said degradation determination section determines the degradation in the capacitor, repeat a decrease of a maximum output value from the power converting apparatus in units of predetermined suppression amounts.

2. The apparatus according to claim 1, wherein said output suppressing section repeats the decrease of the maximum output value in units of predetermined suppression amounts until the maximum output value becomes not more than a predetermined value.

3. The apparatus according to claim 2, wherein when a sum of suppression amounts of the maximum output value exceeds a predetermined value, said output suppressing section stops output of the power converting apparatus.

4. The apparatus according to claim 3, wherein when a sum of suppression amounts of the maximum output value exceeds a predetermined ratio of the maximum output value before suppression, said output suppressing section stops output of the power converting apparatus.

5. The apparatus according to claim 4, wherein the predetermined ratio is 30%.

6. The apparatus according to claim 2, wherein the unit of the suppression amount is 1% of the maximum output value before suppression.

7. The apparatus according to claim 1, wherein the capacitor comprises a smoothing capacitor arranged at an input section of the power converting apparatus.

8. The apparatus according to claim 7, wherein said degradation determination section determines the degradation on the basis of a ripple component of a voltage across terminals of the capacitor.

9. The apparatus according to claim 7, wherein said degradation determination section determines the degradation on the basis of a ripple component of a DC current of the capacitor.

10. The apparatus according to claim 7, wherein said degradation determination section determines the degradation on the basis of an increase in temperature of the capacitor.

11. The apparatus according to claim 1, further comprising warning section arranged to warn a user about the degradation in capacitor when said degradation determination section determines the degradation in the capacitor.

12. The apparatus according to claim 3, further comprising warning section arranged to warn a user about the degradation in the capacitor when said degradation determination section determines the degradation in capacitor, and warning that a service life of the capacitor is going to expire when the sum of the suppression amounts in said output suppressing means exceeds the predetermined value.

13. A DC power generation system comprising a DC power supply, a power converting apparatus for converting DC power output from said DC power supply into AC power, and a load operated by the AC power, wherein the power converting apparatus comprises the power converting apparatus of claim 1.

14. The system according to claim 13, wherein said DC power supply comprises a solar battery.

15. A control method for a power converting apparatus having a capacitor, comprising:
   a degradation determination step of determining a degradation in the capacitor; and
   an output suppressing step of, while the degradation in the capacitor is determined in the degradation determination step, repeating a decrease of a maximum output value from the power converting apparatus in units of predetermined suppression amounts.

16. The method according to claim 15, wherein in the output suppressing step, the decrease of the maximum output value is repeated in units of predetermined suppression amounts until the maximum output value becomes not more than a predetermined value.

17. The method according to claim 16, wherein in the output suppressing step, when a sum of suppression amounts of the maximum output value exceeds a predetermined value, output of the power converting apparatus is stopped.

18. A program which is executed by a computer to realize the power converting apparatus control method of claim 15.

19. A recording medium which stores the program of claim 18.

* * * * *